United States Patent
Saito

(10) Patent No.: US 8,606,990 B2
(45) Date of Patent: Dec. 10, 2013

(54) ELECTRONIC APPARATUS

(75) Inventor: Takeshi Saito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 315 days.

(21) Appl. No.: 13/039,803

(22) Filed: Mar. 3, 2011

(65) Prior Publication Data

US 2011/0225354 A1  Sep. 15, 2011

(30) Foreign Application Priority Data

Mar. 10, 2010  (JP) .................. 2010-053038

(51) Int. Cl.
*G06F 13/00* (2006.01)

(52) U.S. Cl.
USPC ........................... 711/105; 711/154; 711/171

(58) Field of Classification Search
USPC ......... 711/1, 5, 100, 105, 109, 119, 154, 171, 711/172; 365/230.03, 233.1, 233.13
See application file for complete search history.

(56) References Cited

U.S. PATENT DOCUMENTS

| | | | |
|---|---|---|---|
| 7,274,583 B2 * | 9/2007 | Park et al. | 365/63 |
| 7,804,735 B2 * | 9/2010 | Mao et al. | 365/233.13 |
| 2009/0219779 A1 | 9/2009 | Mao et al. | |
| 2010/0122024 A1 * | 5/2010 | Noyes et al. | 711/108 |

FOREIGN PATENT DOCUMENTS

| | | | | |
|---|---|---|---|---|
| JP | H09-305485 | 11/1997 | | |
| JP | 2004-334256 | 11/2004 | | |
| JP | 2005-228055 | 8/2005 | | |
| JP | 2009-116641 | 5/2009 | | |
| JP | 2009-116962 | 5/2009 | | |
| JP | 2009116962 A * | 5/2009 | | G06F 12/00 |

* cited by examiner

*Primary Examiner* — Tuan Thai
*Assistant Examiner* — Zhuo Li
(74) *Attorney, Agent, or Firm* — Workman Nydegger

(57) ABSTRACT

An electronic apparatus includes a memory control circuit that controls a first memory and a second memory, the first memory is connected to the memory control circuit through a first data bus, the second memory is connected to the memory control circuit through the first data bus and a second data bus, and a sum of bus widths of the first data bus and the second data bus is larger than the bus width of the first data bus by a times. When the memory control circuit receives an access request for the second memory, the memory control circuit generates a command for accessing the second memory b times on the basis of an address of the access request point and accesses the second memory.

6 Claims, 10 Drawing Sheets

FIG. 4

CONVERSION TABLE

| ACCESS METHOD | BEFORE CONVERSION | AFTER CONVERSION (ROW) |
|---|---|---|
| N (=32)BIT ACCESS | ADDRESS k | ROW k |
| M1 (=16)BIT ACCESS | ADDRESS k | ROW 2 × k |
| | | ROW 2 × k + 1 |

FIG. 10

| CS1 (STANDARD DRAM) | CS2 (OPTION DRAM) |
|---|---|
| M1 = 4 | N = 32 |
| M1 = 8 | |
| M1 = 16 | |
| M1 = 4 | N = 64 |
| M1 = 8 | |
| M1 = 16 | |
| M1 = 32 | |

ELECTRONIC APPARATUS

The entire disclosure of Japanese Patent Application No. 2010-053038, filed Mar. 10, 2010 is expressly incorporated by reference herein.

BACKGROUND

1. Technical Field

The present invention relates to an electronic apparatus.

2. Related Art

In a control method standardized by JEDEC (Joint Electron Device Engineering Council) concerning access to a DRAM (Dynamic RAM), only a system having the same data bus width for each chip select is prescribed (e.g., in JP-A-2009-116962, a system having data bus widths different for each chip select is described, but a control method thereof is not described).

In the system having the data bus widths different according to the chip selects, it is difficult to appropriately access the DRAM using the control method of the related art.

SUMMARY

An advantage of some aspects of the invention is to provide a technique of appropriately accessing a DRAM in a system having data bus widths differing according to chip selects.

According to an aspect of the invention, there is provided an electronic apparatus comprising a memory control circuit that controls a first memory and a second memory, wherein the first memory is connected to the memory control circuit through a first data bus, wherein the second memory is connected to the memory control circuit through the first data bus and a second data bus, wherein a sum of bus widths of the first data bus and the second data bus is larger than the bus width of the first data bus by a times, and wherein when the memory control circuit receives an access request for the second memory, the memory control circuit generates a command for accessing the second memory b times on the basis of an address of the access request point and accesses the second memory, and when the memory control circuit receives an access request for the first memory, the memory control circuit generates a command for accessing the first memory a×b times on the basis of an address of the access request point and accesses the first memory.

BRIEF DESCRIPTION OF THE DRAWINGS

The invention will be described with reference to the accompanying drawings, wherein like numbers reference like elements.

FIG. 4 is a diagram illustrating a schematic data structure of a conversion table used for address conversion.

FIG. 10 is a diagram illustrating composition of data bus widths of a standard DRAM and an option DRAM.

DESCRIPTION OF EXEMPLARY EMBODIMENTS

Hereinafter, an example of an embodiment of the invention will be described with reference to the drawings.

Figure 1:
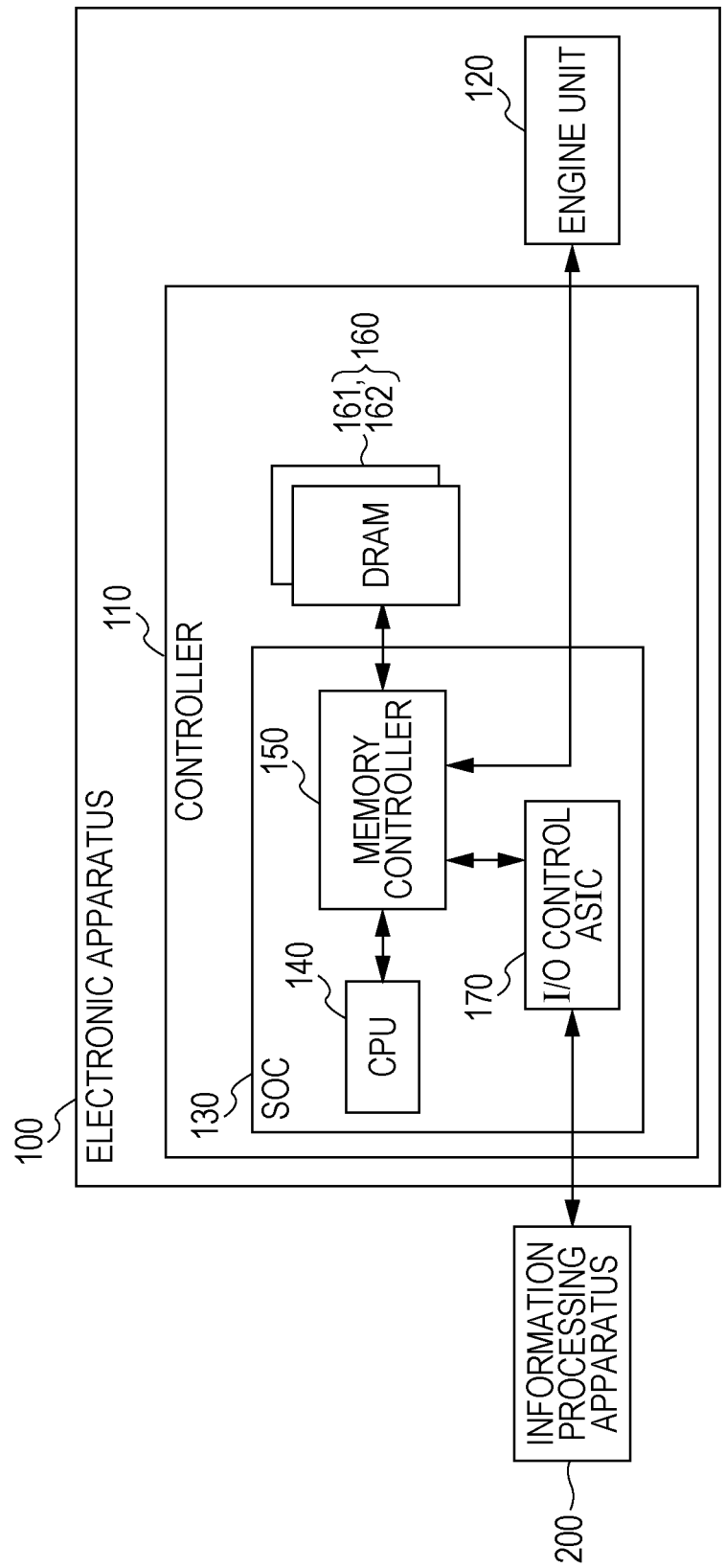
FIG. 1 is a diagram illustrating an example of a hardware configuration of an electronic apparatus according to an embodiment of the invention.

FIG. 1 is a diagram illustrating an example of a hardware configuration of an electronic apparatus 100 according to the embodiment of the invention. As shown in FIG. 1, the electronic apparatus 100 is connected to an information processing apparatus 200.

The information processing apparatus 200 serves as a host computer of the electronic apparatus 100. The information processing apparatus 200 is a general computer provided with a CPU, a RAM, a ROM, an auxiliary storage device such as a hard disk, a display, input devices such as a keyboard and a mouse, and a communication interface. In the information processing apparatus 200, an application program or a driver program (e.g., a printer driver program) is executed.

The electronic apparatus 100 serves as, for example, a printer performing a general printing process. As shown in FIG. 1, the electronic apparatus 100 is provided with a controller 110 as an electronic apparatus control device controlling various processes in the electronic apparatus 100, and an engine unit 120 performing printing on a printing medium and reading a document.

The controller 110 is provided with a CPU 140, a memory controller 150, a DRAM 160, and an I/O (Input/Output) control ASIC 170. The controller 110 controls various mechanisms such as the engine unit 120 to realize a printing function including various image processes, a facsimile function, a scanner function, a copy function, and the like. However, the controller 110 is not limited to this configuration. For example, the CPU 140 may be built in the memory controller 150.

An integrated circuit, on which the CPU 140, the memory controller 150, and the I/O control ASIC 170 are mounted, is hereinafter called an SOC (System On a Chip) 130.

The CPU 140 accesses the DRAM 160 through the memory controller 150, and performs reading and writing various kinds of data, thereby performing various processes. The CPU 140 transmits an access request for accessing the DRAM 160 to the memory controller 150.

The memory controller 150 controls an access from the CPU 140, the I/O control ASIC 170, the engine unit 120 to the DRAM 160. However, memory controller 150 may control a direct memory access to the DRAM 160 irrespective of the CPU 140.

The DRAM 160 is a memory controlled by the memory controller 150. The DRAM 160 is provided with a standard DRAM (On Board) 161 directly connected to a main board having the memory controller 150 and the like thereon, and an option DRAM 162 in which a plurality of DRAM chips such as a DIMM (Dual Inline Memory Module) are mounted on a printed substrate.

The I/O control ASIC 170 controls transmission to and reception from an external apparatus (the information processing apparatus 200, etc.).

The engine unit 120 is a feeding and discharge mechanism, a printing mechanism, and a scanning mechanism to realize a printing function, a facsimile function, a scanner function, a copy function, and includes, for example, a printing engine, a scanner engine, and the like.

Figure 2:
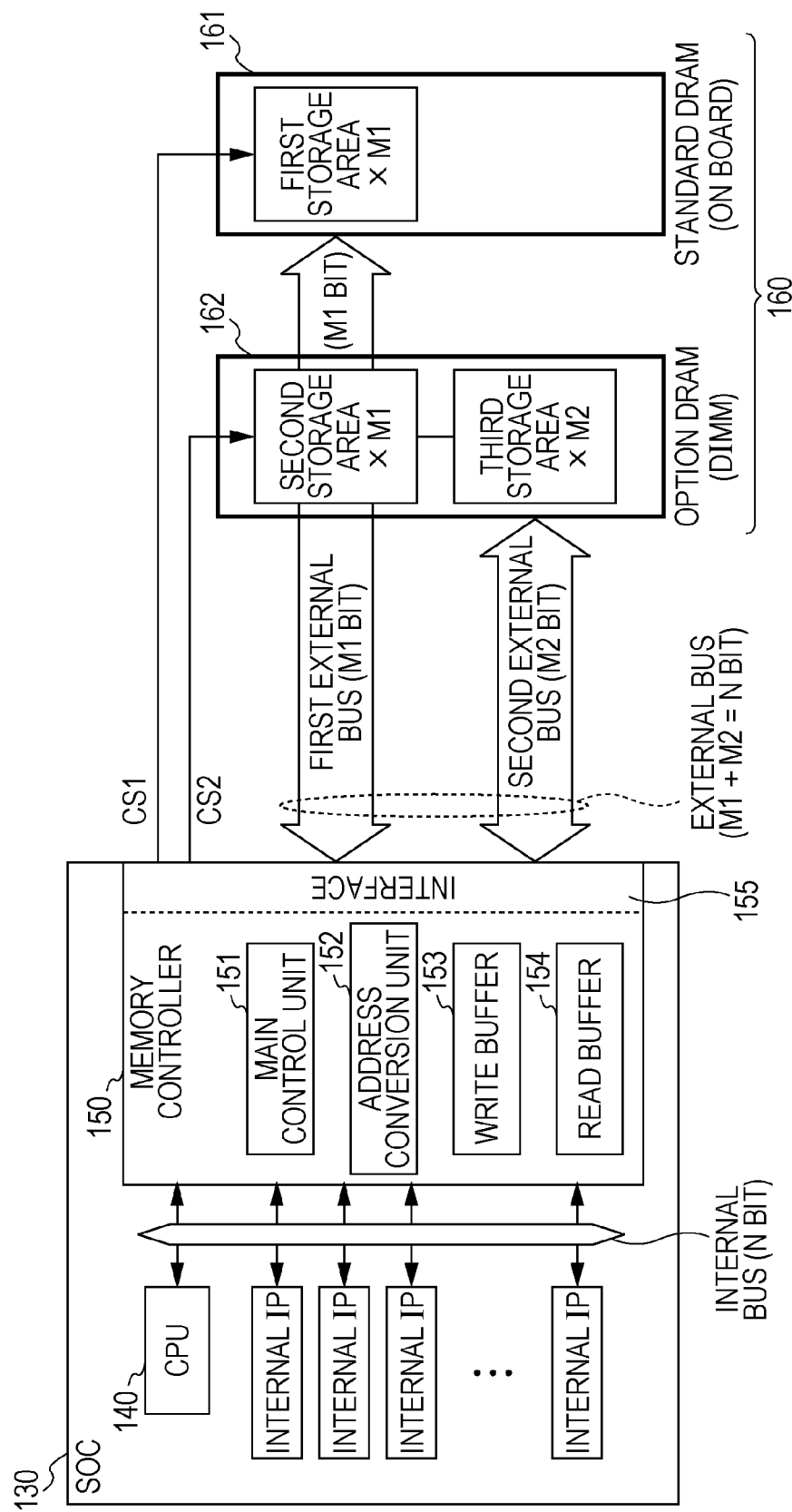
FIG. 2 is a diagram illustrating an example of a hardware configuration of a controller.

FIG. 2 is a diagram for explaining the configuration of the controller 110 in detail. As shown in FIG. 2, the memory controller 150 is connected to the CPU 140 or the other units (devices connected to the I/O control ASIC 170, the printing engine 120, and the like are hereinafter referred to as "internal IP") through an internal bus. The internal bus has an N-bit data bus width.

The memory controller 150 is connected to the standard DRAM 161 and the option DRAM 162 through external buses having different data bus widths.

As shown in FIG. 2, a first external bus between the memory controller 150 and the standard DRAM 161 has an M1-bit data bus width. A second external bus between the memory controller 150 and the option DRAM 162 has an M2-bit data bus width. Accordingly, an external bus between the memory controller 150 and the option DRAM 162 has a (M1+M2)-bit data bus width, and thus has a wider data bus width than that of the first external bus between the memory controller 150 and the standard DRAM 161.

In the embodiment, the relations of N=M1+M2 and M1+M2=2×M1 are satisfied, where N=32, M1=16, and M2=16. That is, the external bus between the memory controller 150 and the option DRAM 162 has a 32-bit data bus width, and has a data bus width double the width of that of the first external bus between the memory controller 150 and the standard DRAM 161.

The standard DRAM 161 is provided with one DRAM chip. The DRAM chip mounted on the standard DRAM 161 has a first storage area accessible by an M1-bit unit.

The option DRAM 162 is provided with two DRAM chips. The two DRAM chips mounted on the option DRAM 162 have a second storage area accessible by an M1-bit unit and a third storage area accessible by an M2-bit unit, respectively.

The memory controller 150 has a main control unit 151, an address conversion unit 152, a write buffer 153, a read buffer 154, and an interface 155.

The main control unit 151 generally controls the units of the memory controller 150. For example, the main control unit 151 controls a writing process of data to the DRAM 160, and a reading process of data from the DRAM 160.

When the main control unit 151 performs the writing of data to the DRAM 160, the main control unit 151 requests to access the DRAM 160 through the internal bus and receives write data. The main control unit 151 transmits logic address information of an access request point to the address conversion unit 152. The main control unit 151 generates a command for writing to a storage area (DRAM 160) indicated by physical address information converted by the address conversion unit 152. In addition, the main control unit 151 transmits the write data to the DRAM 160.

However, the main control unit 151 performs different writing processes in the case of writing to the standard DRAM 161 and in the case of writing to the option DRAM 162. Specifically, when the main control unit 151 performs the writing to the standard DRAM 161, the main control unit 151 divides the write data received by the N-bit unit into a plurality of parts and transmits them to the standard DRAM 161 by the M1-bit unit. In the embodiment, since the relation of N=2×M1 is satisfied, the main control unit 151 divides the write data into two parts. However, when the relation of N=L×M1 is satisfied, the main control unit 151 divides the write data into L parts. When the main control unit 151 performs the writing to the standard DRAM 161, the main control unit 151 supplies a signal (chip select CS1) for selecting the standard DRAM 161 to the standard DRAM 161.

When the main control unit 151 performs the writing to the option DRAM 162, the main control unit 151 transmits the write data received by the N-bit unit to the option DRAM 162 by the N(=M1+M2)-bit unit. When the main control unit 151 performs the writing to the option DRAM 162, the main control unit 151 supplies a signal (chip select CS2) for selecting the option DRAM 162 to the option DRAM 162.

When the main control unit 151 performs the reading of data from the DRAM 160, the main control unit 151 receives a request to access the DRAM 160 through the internal bus. The main control unit 151 transmits logic address information of an access request point to the address conversion unit 152. The main control unit 151 generates a command for reading data from a storage area (DRAM 160) indicated by physical address information converted by the address conversion unit 152. In addition, the main control unit 151 reads the read data from the DRAM 160.

However, the main control unit 151 performs different reading processes in the case of reading from the standard DRAM 161 and in the case of reading from the option DRAM 162. Specifically, when the main control unit 151 performs the reading from the standard DRAM 161, the main control unit 151 transmits the read data divisionally read a plurality times by the M1-bit unit to the internal bus collectively (by the N-bit unit). In the embodiment, since the relation of N=2×M1 is satisfied, the read data is divisionally read from the standard DRAM 161 twice. However, when the relation of N=L×M1 is satisfied, the read data is divisionally read L times. When the main control unit 151 performs the reading from the standard DRAM 161, the main control unit 151 supplies a signal (chip select CS1) for selecting the standard DRAM 161 to the standard DRAM 161.

When the main control unit 151 performs the reading from the option DRAM 162, the main control unit 151 transmits the read data read by the N-bit unit to the internal bus by the N-bit unit. When the main control unit 151 performs the reading from the option DRAM 162, the main control unit 151 supplies a signal (chip select CS2) for selecting the option DRAM 162 to the option DRAM 162.

The address conversion unit 152 performs a process of converting the logic address information of the access request point into physical address information. However, the address conversion unit 152 also performs different address conversions in the case of accessing the standard DRAM 161 and in the case of accessing the option DRAM 162.

Figure 3:
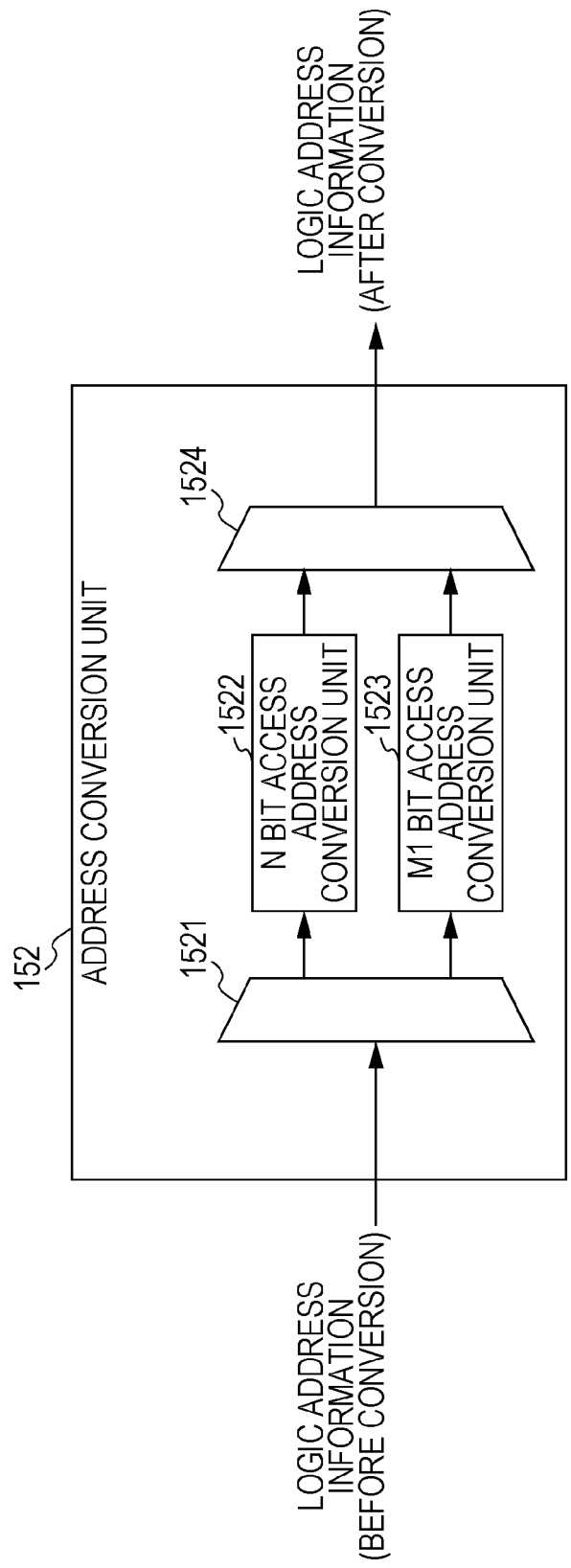
FIG. 3 is a diagram illustrating an example of a hardware configuration of an address conversion unit.

FIG. 3 is a diagram illustrating an example of a schematic configuration of the address conversion unit 152. As shown in FIG. 3, the address conversion unit 152 has an input selector 1521, an N-bit access address conversion unit 1522, an M1-bit access address conversion unit 1523, and an output selector 1524.

As shown in FIG. 3, the input selector 1521 transmits the input logic address information to any one of the N-bit access address conversion unit 1522 and the M1-bit access address conversion unit 1523. Specifically, when it is required to access the option DRAM 162, the input selector 1521 transmits the input logic address information to the N-bit access address conversion unit 1522. When it is required to access the standard DRAM 161, the input selector 1521 transmits the input logic address information to the M1-bit access address conversion unit 1523.

The N-bit access address conversion unit 1522 converts the logic address information transmitted from the input selector 1521 into physical address information necessary to access the option DRAM 162.

FIG. 4 is a diagram illustrating a conversion table for explaining a specific example of the address conversion. As shown in FIG. 4, when the logic address information is transmitted from the input selector 1521, the N-bit access address conversion unit 1522 converts a value (e.g., "k") of the transmitted logic address information into physical address information (row address), where k is an integer of 0 or more.

The M1-bit access address conversion unit 1523 converts the logic address information transmitted from the input selector 1521 into physical address information necessary to access the standard DRAM 161.

For example, as shown in FIG. 4, when the logic address information is transmitted from the input selector 1521, the M1-bit access address conversion unit 1523 converts a value (e.g., "k") of the transmitted logic address information into physical address information (row address). In this case, as shown in FIG. 4, the M1-bit access address conversion unit 1523 converts one piece of logic address information into a plurality of physical address information (row address). The converted physical address information (row address) is "2×k" and "2×k+1". In the embodiment, since the relation of N=2×M1 is satisfied, it is converted into two pieces of physical address information. However, when the relation of N=L×M1 is satisfied, one piece of logic address information is converted into L pieces of physical address information.

The output selector 1524 outputs the physical address information transmitted from the N-bit access address conversion unit 1522 or the M1-bit access address conversion unit 1523. Specifically, when the access to the option DRAM 162 is requested, the output selector 1524 outputs the physical address information transmitted from the N-bit access address conversion unit 1522. When the access to the standard DRAM 161 is requested, the output selector 1524 outputs the physical address information transmitted from the M1-bit access address conversion unit 1523.

Returning to FIG. 2, the write data to the DRAM 160 is temporarily stored in the write buffer 153. For example, when the writing to the standard DRAM 161 is performed, the other write data (N−M1 bits) which cannot be transmitted at one time to the standard DRAM 161 is stored in the write buffer 153.

The read data from the DRAM 160 is temporarily stored in the read buffer 154. For example, when the reading from the standard DRAM 161 is performed, read data divisionally read from the standard DRAM 161 a plurality of times is stored in the read buffer 154.

The interface 155 controls transmission to and reception from (writing and reading) the DRAM 160 accessible through the external bus (the first external bus and the second external bus).

Figure 5:
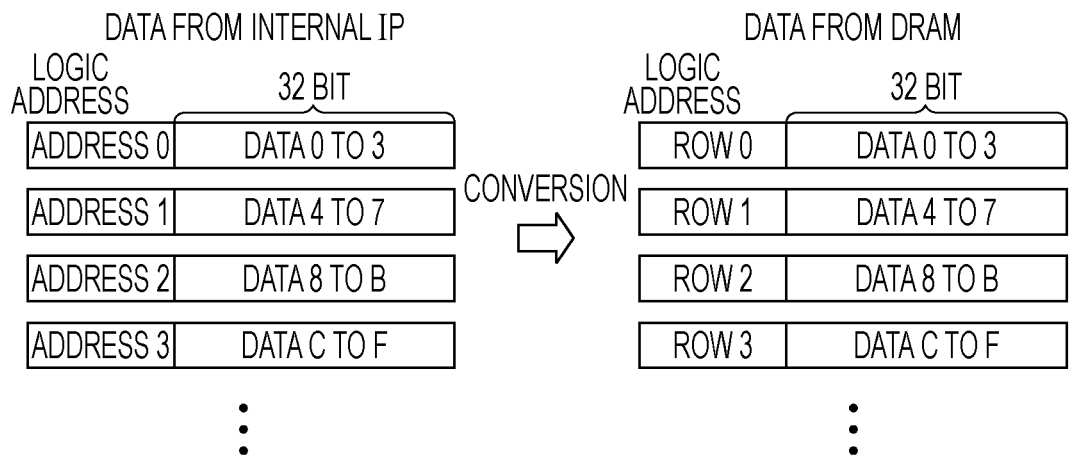
FIG. 5A is a diagram for describing address conversion at the time of N(=32) bit access.
FIG. 5B is a diagram illustrating an image of data stored in a DRAM.

FIG. 5A and FIG. 5B are diagrams illustrating an example of the address conversion at the time of the N(=32)-bit access in the memory controller 150 with such a configuration, and an image of data stored in the DRAM 160.

As shown in FIG. 5A and FIG. 5B, in the case of the N-bit access to the option DRAM 162, the memory controller 150 converts the logic address "k" of the access request point into the physical address (row address) "k". The memory controller 150 transmits the write data received by the N(=32)-bit unit to the option DRAM 162. For this reason, it is possible to write data at a high speed to the option DRAM 162 storable by the N-bit unit.

Figure 6:
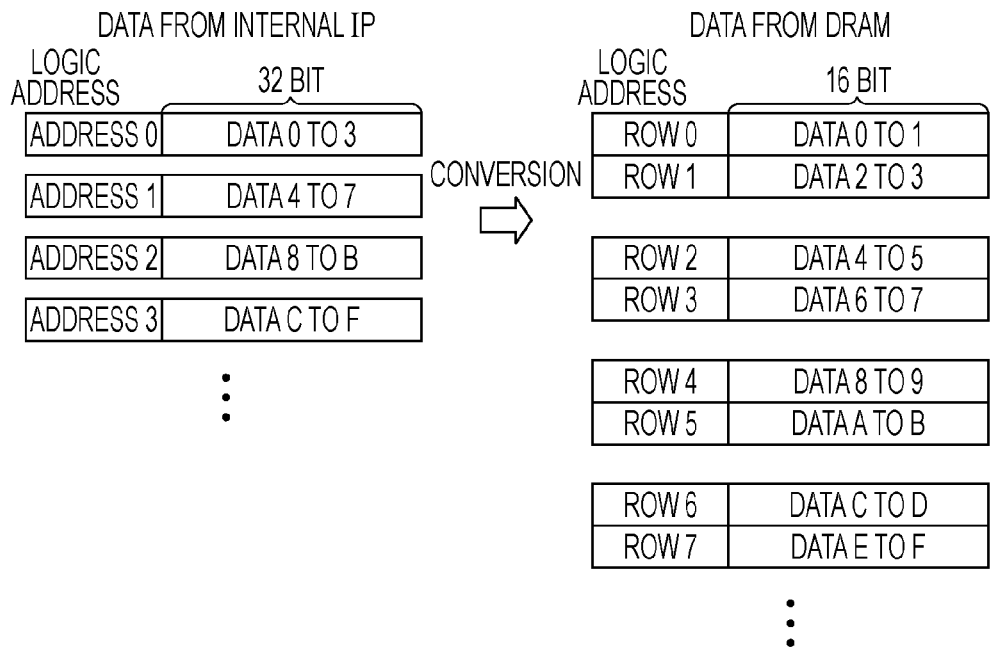
FIG. 6A is a diagram for describing address conversion at the time of M1(=16) bit access.
FIG. 6B is a diagram illustrating an image of data stored in a DRAM.

FIG. 6A and FIG. 6B are diagrams illustrating an example of the address conversion at the time of the M1(=16)-bit access, and an image of data stored in the DRAM 160, in the memory controller 150.

As shown in FIG. 6A and FIG. 6B, in the case of the M1-bit access to the standard DRAM 161, the memory controller 150 performs a shift operation of the logic address "k" of the access request point to generate "2×k" as a physical address (row address). A physical address of "2×k+1" generated by incrementally increasing the generated physical address (row address) "2×k" is generated as the other row address. That is, the memory controller 150 generates a plurality of row addresses "2×k" and "2×k+1" from the logic address "k" of the access request point. The memory controller 150 divides the write data received by the N(=32)-bit unit into write data of each M1(=16)-bit, and transmits the write data to the standard DRAM 161 (pages indicated by the generated row addresses "2×k" and "2×k+1". For this reason, as for the standard DRAM 161 storable by the M1-bit unit, it is possible to write to a proper page (area), and it is possible to write data at a high speed.

The hardware configuration of the electronic apparatus 100 has been described above. Of course, this configuration is to describe the main configuration for explaining characteristics of the invention, which is not limited to the above-described configuration. Other configurations of a general electronic apparatus 100 are not excluded.

Next, a characteristic operation of the memory controller 150 will be described.

Figure 7:
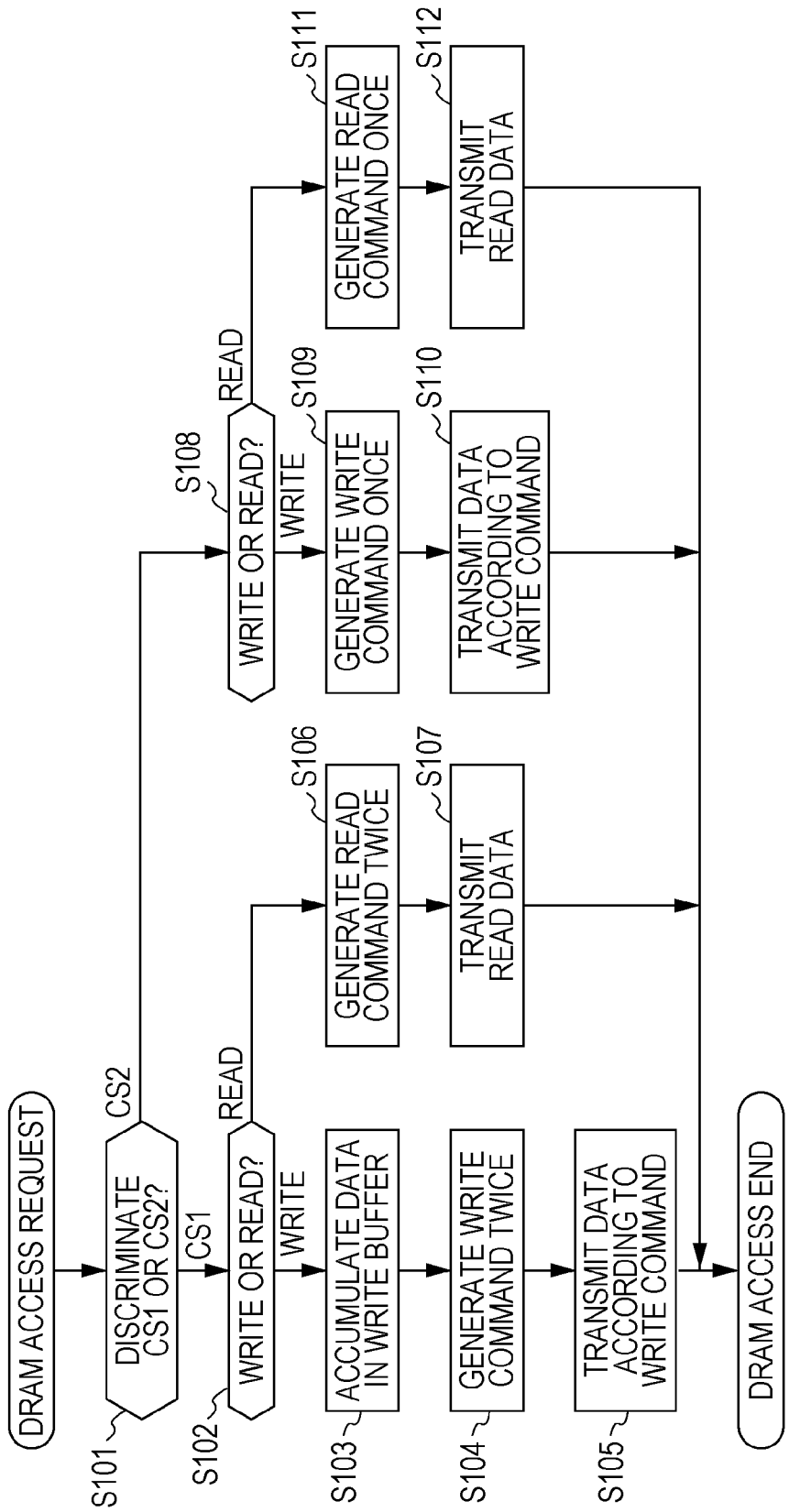
FIG. 7 is a flowchart illustrating an access process to the DRAM.
Figure 8:
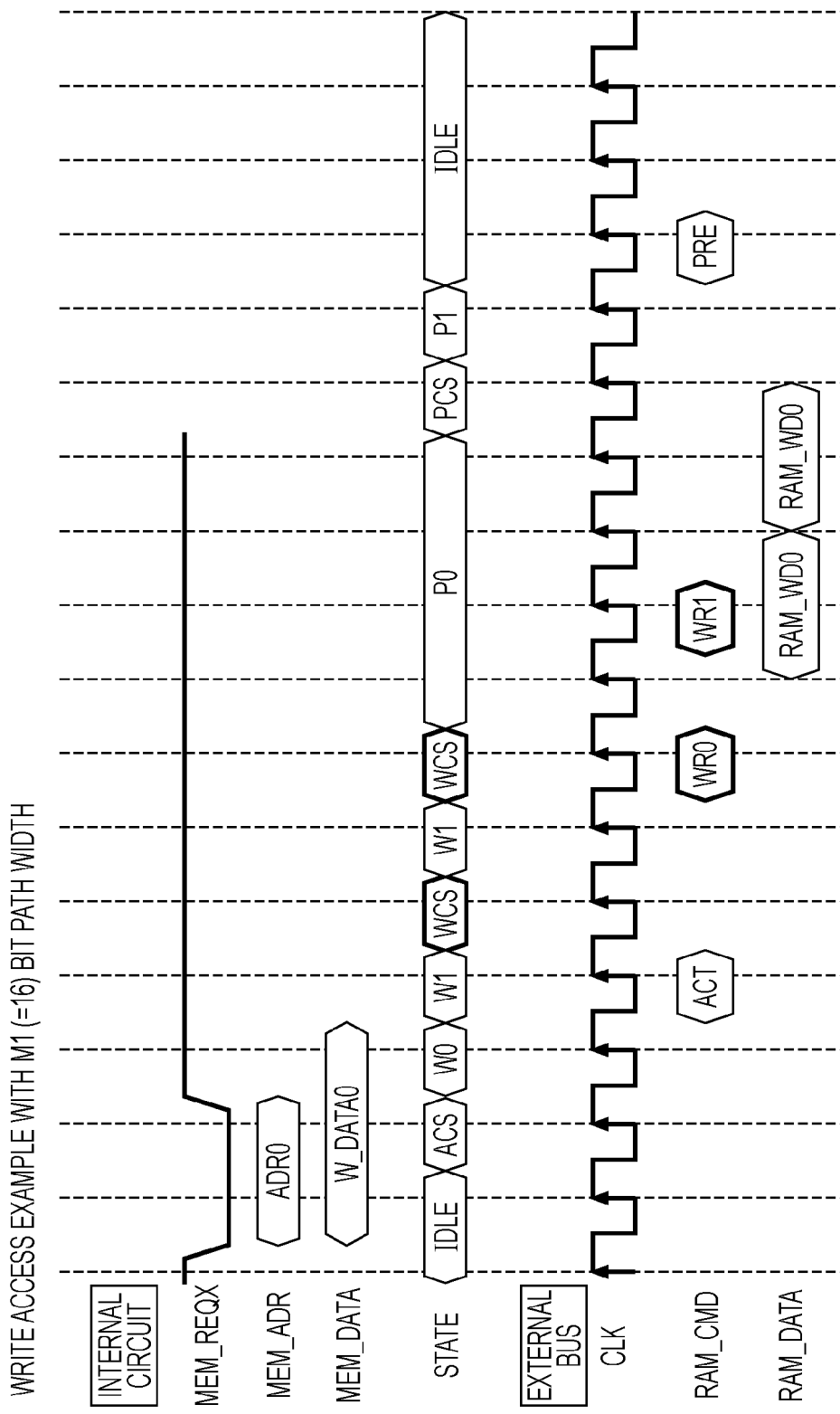
FIG. 8 is a diagram illustrating a waveform of a control signal at the time of M1(=16) bit access.
Figure 9:
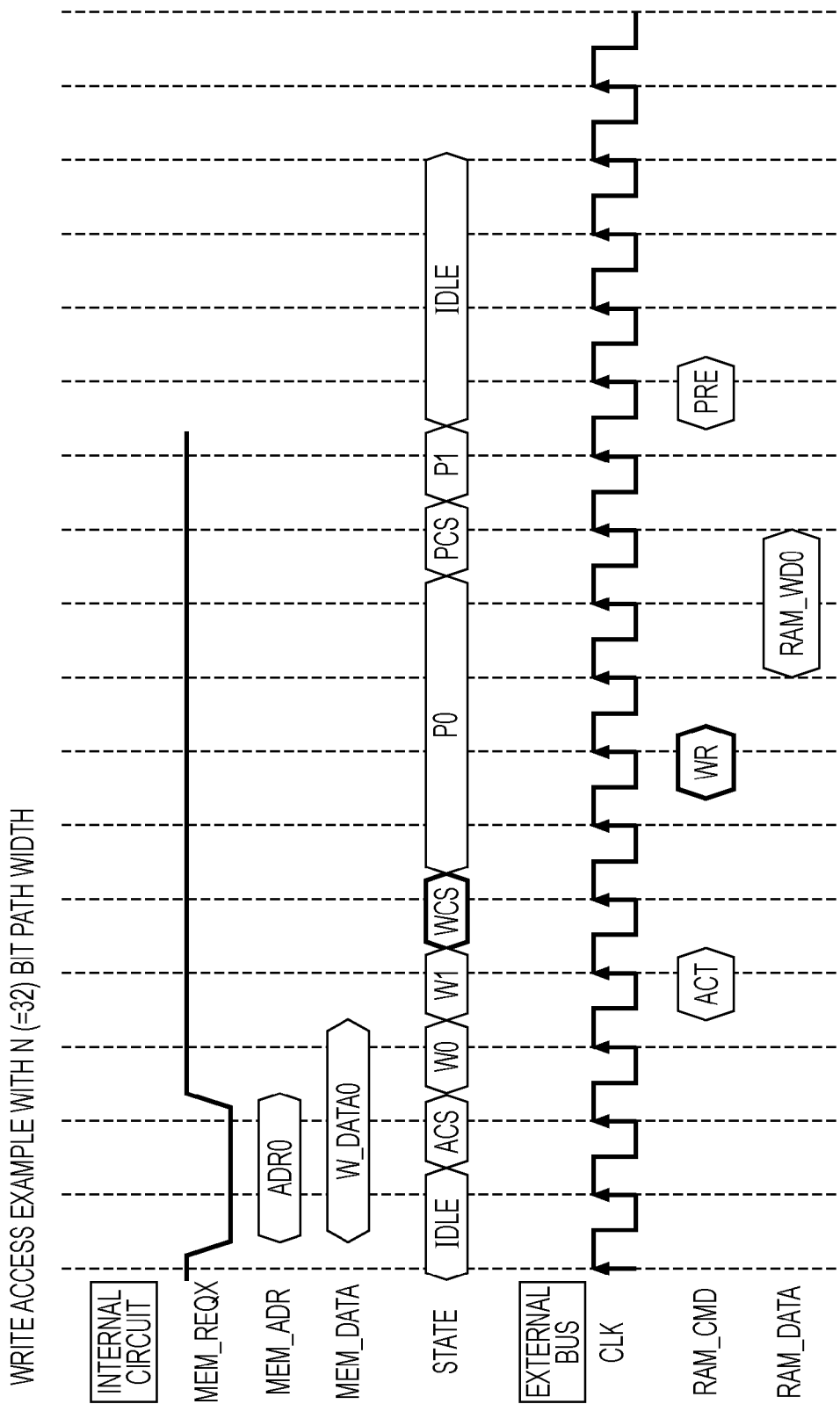
FIG. 9 is a diagram illustrating a waveform of a control signal at the time of N(=32) bit access.

FIG. 7 is a flowchart illustrating the access process to the DRAM 160. FIG. 8 and FIG. 9 are diagrams illustrating waveform examples of signals (data) input and output to the memory controller 150 during the access process.

The memory controller 150 changes a state of the memory controller 150 to an IDLE state, for example, at the time of supplying power or at the time of resetting.

In the IDLE state, when the memory controller 150 receives the request to access the DRAM 160 from the CPU 140 or the internal IP through the internal bus, the memory controller 150 starts the flow. The memory controller 150 determines whether or not to receive the access request on the basis of a predetermined signal (MEM_REQX) supplied from the CPU 140 or the internal IP. As shown in FIG. 8 or FIG. 9, a high signal (MEM_REQX) is supplied to the memory controller 150, for example, when there is no access request. When a low signal (MEM_REQX) is supplied, the memory controller 150 determines that the access request is received. As shown in FIG. 8 and FIG. 9, logic address information (ADR0) designating the DRAM 160 of the access request point and the page is received and the writing to the page is requested, write data (W_DATA0) is also received with the access request. When the memory controller 150 receives the access request, the memory controller 150 generates a command (ACT) for activating the DRAM 160 as an ACS state through the external bus.

Returning to FIG. 7, when the flow is started, the main control unit 151 of the memory controller 150 determines the DRAM 160 of the access request point on the basis of the logic address information (ADR0) received with the access request (Step S101). That is, the main control unit 151 determines whether the DRAM 160 of the access request point is the standard DRAM 161 or the option DRAM 162.

When it is determined that the DRAM 160 of the access request point is the standard DRAM 161 (S101: CS1), the main control unit 151 supplies a signal (chip select CS1) for selecting the standard DRAM 161 to the standard DRAM 161, and the process transfers to Step S102.

When the process transfers to Step S102, the main control unit 151 determines whether the access request for the standard DRAM 161 is a writing (write) request or a reading (read) request according to whether or not the write data (W_DATA0) is received with the access request (Step S102).

When the write data (W_DATA0) is received, the main control unit 151 determines the access request as the writing (write) request (Step S102: Write), and the process transfers to Step S103. When the write data (W_DATA0) is not received, the main control unit 151 determines the access request as the reading (read) request (Step S102: Read), and the process transfers to Step S106.

When the process transfers to Step S103, the main control unit 151 divides the write data (W_DATA0) received by the N(=32)-bit unit into M1-bit data (hereinafter, referred to as "first write data") which can be transmitted at once to the standard DRAM 161 through the first external bus (data bus width: M1) and the other N−M1(=M1)-bit data (hereinafter, referred to as "second write data"). The main control unit 151 accumulates the other N−M1-bit second write data in the write buffer 153 (Step S103).

The main control unit 151 generates a write command for writing data (the first write data and the second write data) to the standard DRAM 161 twice (Step S104).

The first generated write command (WR0) is a write command for writing the first write data (M1 bits) divided in Step S103 to the standard DRAM 161. A writing destination (page area) of the first write data based on the first generated write command (WR0) is designated as physical address information converted by the M1-bit access address conversion unit 1523 of the address conversion unit 152. The physical address information includes a row address "2×k" generated by a shift operation of the value "k" of the logic address information.

The second generated write command (WR1) is a write command for writing the second write data (N−M1 bits) divided in Step S103 to the standard DRAM 161. A writing destination (page area) of the second write data based on the second generated write command (WR1) is designated as physical address information converted by the M1-bit access address conversion unit 1523 of the address conversion unit 152. The physical address information includes a row address "2×k+1" generated by a shift operation and increment of the value "k" of the logic address information.

In such a manner, as shown in FIG. 6A and FIG. 6B, it is possible to write data to the standard DRAM 161 using the M1-bit unit.

As shown in FIG. 8, the first write command (WR0) is generated, after waiting for a predetermined time (states W0 and W1) from the ACS state and after the state becomes a WCS state. The second write command (WR1) is generated, after waiting for a predetermined time again (state W1) from the WCS state and after the state becomes the WCS state again.

Returning to FIG. 7, the main control unit 151 transmits the data (the first write data and the second write data) to the standard DRAM 161 according to the generating time of the write command in Step S104 (Step S105). Specifically, as shown in FIG. 8, after generating the first write command (WR0), the main control unit 151 transmits the first write data (RAM_WD0) divided in Step S103 through the interface 155. Similarly, after generating the second write command (WR1), the main control unit 151 transmits the second write data (RAM_WD1) accumulated in the write buffer 153 in Step S103 through the interface 155.

The standard DRAM 161 stores the first write data (RAM_WD0) transmitted from the memory controller 150 in a page (area) designated as the row address "2×k". The standard DRAM 161 stores the second write data (RAM_WD1) transmitted from the memory controller 150 in a page (area) designated as the row address "2×k+1".

Thereafter, the main control unit 151 generates a precharge command (PRE) to the standard DRAM 161, and ends the access process (the flow).

When the process transfers from Step S102 to Step S106, the main control unit 151 generates a read command for reading the data from the standard DRAM 161 twice (Step S106).

The first generated read command is a read command for reading the M1-bit data (hereinafter, referred to as "first read data") from the standard DRAM 161. A reading source (page area) of the first read data based on the first generated read command is designated as physical address information converted by the M1-bit access address conversion unit 1523 of the address conversion unit 152. The physical address information includes a row address "2×k" generated by a shift operation of the value "k" of the logic address information.

The main control unit 151 reads the first read data stored in the page (area) designated as the row address "2×k" from the standard DRAM 161 according to the generation of the first read command. The main control unit 151 accumulates the read first read data in the read buffer 154.

The second generated read command is a read command for reading the M1-bit data (hereinafter, referred to as "second read data") subsequent from the first read data read according to the generation of the first read data, from the standard DRAM 161. The reading source (page area) of the second read data based on the second generated read command is designated as physical address information converted by the M1-bit access address conversion unit 1523 of the address conversion unit 152. The physical address information includes a row address "2×k+1" generated by a shift operation and increment of the value "k" of the logic address information.

The main control unit 151 reads the second read data stored in the page (area) designated as the row address "2×k+1" from the standard DRAM 161 according to the generation of the second generated read command.

Then, the main control unit 151 composes the first read data (M1 bits) accumulated in the read buffer 154 and second read data (M1 bits) after some time from the reading from the standard DRAM 161, to generate N(=M1+M1)-bit data. The main control unit 151 transmits the generated N-bit data to the access requesting source (the CPU 140 or the internal IP) through the internal bus (Step S107).

Thereafter, the main control unit 151 generates a precharge command (PRE) to the standard DRAM 161, and ends the access process (the flow).

In Step S101, when the DRAM 160 of the access request point is determined as the option DRAM 162 (S101: CS2), the main control unit 151 supplies to the option DRAM 162 a signal (chip select CS2) for selecting the option DRAM 162, and the process transfers to Step S108.

When the process transfers to Step S108, the main control unit 151 determines whether the access request for the standard DRAM 161 is a writing (write) request or a reading (read) request according to whether or not the write data (W_DATA0) is received with the access request (Step S108).

When the write data (W_DATA0) is received, the main control unit 151 determines the access request as the writing (write) request (Step S108: Write), and the process transfers to Step S109. When the write data (W_DATA0) is not received, the main control unit 151 determines the access request as the reading (read) request (Step S108: Read), and the process transfers to Step S111.

When the process transfers to Step S109, the main control unit 151 generates, once, a write command for writing the write data (W_DATA0) received by the N(=32)-bit unit to the option DRAM 162 through the first external bus (data bus width: M1) and the second external bus (data bus width: M2) (Step S109).

The generated write command is a write command for writing the N-bit data received through the internal bus, to the option DRAM 162 once. The writing destination (page area) of the data is designated as physical address information converted by the N-bit access address conversion unit 1522 of the address conversion unit 152. The physical address information includes a row address "k" equal to the value "k" of the logic address information.

In such a manner, as shown in FIG. 5A and FIG. 5B, it is possible to write data to the option DRAM 162 by the N(=M1+M2)-bit unit.

Then, the main control unit 151 transmits the write data to the option DRAM 162 according to the generating time of the write command in Step S109 (Step S110).

The option DRAM 162 stores the write data transmitted from the memory controller 150 in the page (area) designated as the row address "k".

Thereafter, the main control unit 151 generates a precharge command (PRE) to the option DRAM 162, and ends the access process (the flow).

When the process transfers from Step S108 to Step S111, the main control unit 151 generates a read command for reading the data from the option DRAM 162 once (Step S111).

The generated read command is a read command for reading the N-bit data from the option DRAM 162 once. The reading source (page area) of data is designated as the physical address information converted by the N-bit access address conversion unit 1522 of the address conversion unit 152. The physical address information includes a row address "k" equal to the value "k" of the logic address information.

The main control unit 151 reads the read data stored in the page (area) designated by the row address "k" from the option DRAM 162 according to the generation of the read command.

Then, the main control unit 151 transmits the read data (N bits) after some time from the reading from the option DRAM 162 to the access requesting source (the CPU 140 or the internal IP) through the internal bus (Step S112).

Thereafter, the main control unit 151 generates a precharge command (PRE) to the option DRAM 162, and ends the access process (the flow).

By the access process described above, it is possible to appropriately access the DRAM 160 at a high speed in a system with different bus widths by the chip selects (CS1 and CS2 in the example).

The process units of the flow are divided according to the main process contents to easily understand the memory controller 150. The invention is not limited by the classification method or the names of the process steps. The processes performed by the memory controller 150 may be divided into even more process steps. One process step may perform even more processes.

The embodiment tends to exemplify the main concept of the invention, and does not limit the invention. Persons skilled in the art can clearly understand various substitutes, amendments, and modifications.

For example, in the embodiment, the memory controller 150 is connected to the standard DRAM 161 through the external bus having 16 (M1)-bit data bus width, and is connected to the option DRAM 162 through the external bus (the first external bus and the second external bus) having the 32 (N)-bit data bus width. However, the invention is not limited thereto.

FIG. 10 is a diagram illustrating an example of the composition of the data bus width (M1 bits) for the first external bus between the memory controller 150 and the standard DRAM 161, and the data bus width (N=M1+M2 bits) for the external bus between the memory controller 150 and the option DRAM 162.

For example, as shown in FIG. 10, the invention may be (M1, N)=(4, 32), (8, 32), (16, 32), (4, 64), (8, 64), (16, 64), (32, 64).

Even in the case of the composition shown in FIG. 10, the main control unit 151 may divide the write data received by the N-bit unit into L(=N/M1) when the main control unit 151 performs the writing to the standard DRAM 161. The main control unit 151 generates a write command for writing data to the standard DRAM 161 a times. In this case, the row address designating the page (area) of the writing designation may be an integer value of an increment from "L×k" to "(L×k)+L−1".

Similarly, when the reading from the standard DRAM 161 is performed, the main control unit 151 generates a read command for reading by the M1-bit unit L(=N/M1) times. In this case, the row address designating the page (area) of the reading source may be an integer value of an increment from "L×k" to "(L×k)+L−1".

In the embodiment and the modification example, the example of the case where the data bus width of the internal bus is equal to the data bus width of the first external bus, that is, N=M1+M2 is satisfied is described. However, the invention is not limited thereto, and may be N≠M1+M2. However, it is assumed that the external bus (data bus width: M1+M2) between the memory controller 150 and the option DRAM 162 has a data bus width larger than that of the first external bus (data bus width: M1) between the memory controller 150 and the standard DRAM 161 by a(={M1+M2}/M1) times (i.e., M1+M2=a×M1).

In this case, the main control unit 151 has to divide the write data received by the N-bit unit into b(=N/{M1+M2}) when the writing to the option DRAM 162 is performed by the M1+M2-bit unit. The main control unit 151 generates a write command for writing data to the option DRAM 162 b times. In this case, the row address designating the page (area) of the writing designation may be an integer value of an increment from "b×k" to "(b×k)+b−1". However, k is an integer of 0 or more.

On the contrary, the main control unit 151 may divide the write data received by the N-bit unit into a×b(=N/M1) when the writing to the standard DRAM 161 is performed by the M1-bit unit. The main control unit 151 generates a write command for writing data to the standard DRAM 161 a×b times. In this case, the row address designating the page (area) of the writing designation may be an integer value of an increment from "(a×k)×k" to "(a×k)×k+(a×b)−1". However, k is an integer of 0 or more.

When the reading from the option DRAM 162 is performed, the main control unit 151 generates a read command for reading by the M1+M2-bit unit b(=N/{M1+M2}) times. In this case, the row address designating the page (area) of the writing designation may be an integer value of an increment from "b×k" to "(b×k)+b−1". However, k is an integer of 0 or more.

On the contrary, when the reading to the standard DRAM 161 is performed by the M1-bit unit, the main control unit 151 generates a read command for reading by the M1-bit unit a×b(=N/M1) times. In this case, the row address designating the page (area) of the writing designation may be an integer value of an increment from "(a×b)×k" to "(a×k)×k+(a×b)−1". However, k is an integer of 0 or more.

What is claimed is:

1. An electronic apparatus comprising:
   a first data bus having a first bus width M1;
   a second data bus having a second bus width M2;
   a first memory;
   a second memory;
   a memory control circuit that controls the first memory and the second memory,
   the first memory being connected to the memory control circuit through the first data bus,
   the second memory being connected to the memory control circuit through the first data bus and the second data bus,
   a sum of the first bus width and the second bus width being larger than the first bus width by a times, wherein a=(M1+M2)/M1, and
   when the memory control circuit receives an access request for the second memory, the memory control circuit generates a command for accessing the second memory b times on the basis of an address of the access request point and accesses the second memory, and
   when the memory control circuit receives an access request for the first memory, the memory control circuit generates a command for accessing the first memory a×b times on the basis of an address of the access request point and accesses the first memory.

2. The electronic apparatus according to claim 1, wherein the first bus width is 16 bits,
   wherein the sum of the first bus width and the second bus width is 32 bits which is double the first bus width of the first data bus,
   wherein when the memory control circuit receives the access request for the second memory, the memory control circuit generates a command for accessing the second memory once on the basis of the address of the access request point and accesses the second memory, and
   when the memory control circuit receives the access request for the first memory, the memory control circuit generates a command for accessing the first memory twice on the basis of the address of the access request point and accesses the first memory.

3. The electronic apparatus according to claim 2, wherein when the memory control circuit receives the access request for the second memory, the memory control circuit generates a command for accessing a row address corresponding to an address value of the access request point once, and
   wherein when the memory control circuit receives the access request for the first memory, the memory control circuit generates a command for accessing a row address corresponding to a double value of the address value of the access request point and a command for accessing a row address corresponding to a value obtained by adding 1 to the double value of the address value of the access request point.

4. The electronic apparatus according to claim 1, wherein the memory control circuit receives the access request for the first memory or the second memory through a predetermined internal bus from units in the electronic apparatus, and
   wherein a bus width of the internal bus is equal to the sum of the first bus width of the first data bus and the second bus width the second data bus.

5. The electronic apparatus according to claim 1, wherein the second memory is a DIMM (Dual Inline Memory Module).

6. The electronic apparatus according to claim 1, which is a printer, a copier, a scanner, or a complex machine.

* * * * *